(12) United States Patent
Yang et al.

(10) Patent No.: US 11,176,430 B2
(45) Date of Patent: Nov. 16, 2021

(54) MULTI CARD SOCKET FOR MOBILE COMMUNICATION TERMINAL AND MULTI CARD CONNECTOR COMPRISING THE SAME

(71) Applicant: Molex, LLC, Lisle, IL (US)

(72) Inventors: In Chull Yang, Gunpo-si (KR); In Ho You, Siheung-si (KR); Byung Kyu Bae, Hwaseong-si (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/798,421

(22) Filed: Feb. 23, 2020

(65) Prior Publication Data

US 2020/0293841 A1 Sep. 17, 2020

(30) Foreign Application Priority Data

Mar. 12, 2019 (KR) .......................... 10-2019-0028346

(51) Int. Cl.
*G06K 13/06* (2006.01)

(52) U.S. Cl.
CPC .................................... *G06K 13/06* (2013.01)

(58) Field of Classification Search
CPC ............ H01R 13/62933; H01R 13/633; H01R 13/6335; H01R 27/00; G06K 13/06
USPC ......................................... 439/630, 489, 157
See application file for complete search history.

(56) References Cited

U.S. PATENT DOCUMENTS

| | | | |
|---|---|---|---|
| 7,775,805 B2 * | 8/2010 | Liao .................... | H01R 13/2435 439/66 |
| 8,123,538 B2 * | 2/2012 | Xu ...................... | H01R 13/2442 439/188 |
| 8,267,725 B2 * | 9/2012 | Zhu ....................... | H01R 13/41 439/660 |
| 8,298,021 B2 * | 10/2012 | Huang ............... | H01R 13/2442 439/862 |
| 8,568,174 B2 * | 10/2013 | Liu ........................ | H01R 27/02 439/630 |
| 8,770,995 B2 * | 7/2014 | Naito ................... | G06K 7/0021 439/159 |

(Continued)

FOREIGN PATENT DOCUMENTS

CN 101334831 A 12/2008
CN 201230059 Y 4/2009

(Continued)

*Primary Examiner* — Gary F Paumen

(57) ABSTRACT

A card socket for mounting a SIM card and an SD card for a mobile communication terminal includes a housing and a shell. The housing includes a first terminal portion having a first terminal disposed therein, a second terminal portion having a second terminal and a third terminal disposed therein, and a switch portion. The shell includes an upper wall and a sidewall. The shell includes a sensing portion extended from the upper wall to detect insertion of a card tray into the card socket. The sensing portion has a shape which is extended downward from the upper wall in the height direction and then is extended upward in the height direction. The switch portion includes a stopper which is configured to come into contact with an upper surface of the sensing portion and to prevent the sensing portion from being lifted up in the height direction.

19 Claims, 12 Drawing Sheets

(56) References Cited

U.S. PATENT DOCUMENTS

| | | | | |
|---|---|---|---|---|
| 8,777,669 B2* | 7/2014 | Hu | .................. | H01R 13/641 |
| | | | | 439/630 |
| 2006/0276082 A1* | 12/2006 | Hung | .................. | H01R 27/00 |
| | | | | 439/630 |
| 2010/0279552 A1* | 11/2010 | Zhu | .................. | G06K 7/0021 |
| | | | | 439/630 |
| 2010/0297886 A1* | 11/2010 | Lai | .................. | H01R 12/7094 |
| | | | | 439/630 |

FOREIGN PATENT DOCUMENTS

| | | | |
|---|---|---|---|
| CN | 105449470 | A | 3/2016 |
| CN | 106463862 | A | 2/2017 |
| CN | 107533625 | A | 1/2018 |
| JP | 2009-016043 | A | 1/2009 |
| KR | 10-1630766 | B1 | 6/2016 |
| TW | 585357 | U | 4/2004 |
| TW | M346176 | U | 12/2008 |
| TW | 201637292 | A | 10/2016 |

\* cited by examiner

MULTI CARD SOCKET FOR MOBILE COMMUNICATION TERMINAL AND MULTI CARD CONNECTOR COMPRISING THE SAME

RELATED APPLICATION

This application claims priority to Korean Application Serial No. 10-2019-0028346, filed Mar. 12, 2019, which is incorporated by reference in its entirety.

TECHNICAL FIELD

The present disclosure relates to a multi card socket for a subscriber identification module (SIM) card and a secure digital (SD) card installed in a mobile communication terminal, and a multi card connector including the same. More specifically, the present disclosure relates to a multi card socket for a SIM card and an SD card installed in a mobile communication terminal, which can reduce a length of the card socket while preventing swelling of the card socket caused by a contact resistance between a card and a terminal in the card socket, and a multi card connector including the same.

BACKGROUND ART

In a mobile phone, a laptop computer, and other mobile communication terminals, a subscriber identification module (SIM) card containing subscriber identification information (including a universal SIM (USIM) card, a standard SIM card, a mini SIM card, a micro SIM card, a nano SIM card, etc.) is normally used. In addition, in such an electronic device, a secure digital (SD) card (including a standard SD card, a mini SD card, a micro SD card, etc.) is used to additionally secure a data storage space.

In recent years, various technologies for mounting both a SIM card and an SD card in a mobile communication terminal via a single card connector have been developed. The card connector for the SIM card and the SD card may include a card socket installed or fixed to the mobile communication terminal, and a card tray installed in the card socket to support the card. The SIM card and/or the SD card is typically loaded onto the card tray, and the SIM card and/or the SD card loaded onto the card tray may be electrically connected to an electronic device by inserting the card tray into the card socket. The card tray may move in a direction of insertion or ejection of the card into or from the card socket. A fixing device is provided inside the card socket to prevent the card tray from being ejected from the card socket without separate other operations after the card tray is inserted into the card socket.

Korean Registered Patent Publication No. 10-1630766 discloses a card socket in which a detect terminal separately fabricated is installed in a housing. Since the detect terminal in the above-mentioned document is separately fabricated from the housing, a manufacturing cost increases, and there is a problem that, after a card tray is mounted and dismounted multiple times, the card socket is easily deformed.

SUMMARY

Various embodiments of the disclosure provide a multi card connector for a SIM card and an SD card installed in a mobile communication terminal, which includes a card tray provided with a space capable of receiving a plurality of cards, preferably, three cards, simultaneously, and a card socket having a sensing portion formed in a shell to detect insertion of the card tray, and a card connector including the same.

According to an embodiment of the disclosure, a card socket for mounting a SIM card or an SD card for a mobile communication terminal includes a housing and a shell. The housing may include a terminal portion in which a contact terminal is disposed, and a switch portion which is formed inside the terminal portion in a longitudinal direction of the housing. The shell may include an upper wall and a sidewall which is extended downward from the upper wall in a height direction to be coupled to the housing, and the shell may include a sensing portion which is extended from the upper wall to sense insertion of a card tray into the card socket, and a coupling portion which is extended downward from the upper wall in the height direction to be inserted into the switch portion.

According to an embodiment, the switch portion may include a stopper which is configured to come into contact with an upper surface of the sensing portion and to prevent the sensing portion from being lifted up in the height direction.

According to an embodiment, the sensing portion may have a shape extended downward from the upper wall in the height direction and then extended toward the other side in a width direction.

According to an embodiment, the terminal portion may include a first terminal portion which is formed on one side in a width direction and has a first terminal disposed therein, and a second terminal portion which is formed on the other side in the width direction of the housing and has a second terminal and a third terminal disposed therein.

According to an embodiment, the switch portion may include a switch extended upward in the height direction of the housing, and the sensing portion may be configured to move down in the height direction and to come into contact with the switch when the card tray comes into contact with the sensing portion.

According to an embodiment, the coupling portion may have a recess formed therein to have a part of the switch portion inserted thereinto.

According to an embodiment, the coupling portion may include a wedge portion having an inclined shape to come into contact with the switch portion.

According to an embodiment, the sensing portion may include an inclined portion which is extended outward in the longitudinal direction and is inclined toward the switch portion.

According to an embodiment, the second terminal portion may include a second-a terminal portion in which the second terminal is formed, and a second-b terminal portion in which the third terminal is formed, and the second-b terminal portion may be disposed more inwards in the longitudinal direction than the second-a terminal portion.

According to an embodiment, an inward leading end of the first terminal portion may be formed more inwards in the longitudinal direction than an inward leading end of the second-a terminal portion.

According to an embodiment, the card socket may further include a hinge installed inwards in the longitudinal direction of the switch portion, and an eject bar installed on a position of one side of the first terminal portion in the width direction to be slidable in the housing along the longitudinal direction.

According to an embodiment, the second terminal may include a plurality of contact terminals, and a contact terminal from among the plurality of contact terminals that is adjacent to the first terminal portion and is positioned outward in the longitudinal direction may include a main contact terminal and sub contact terminals formed on both sides of the main contact terminal to have a maximum height lower than the main contact terminal.

According to an embodiment of the present disclosure, a card connector for mounting a SIM card or an SD card for a mobile communication terminal includes a card socket and a card tray inserted into the card socket. The card socket may include a housing including a terminal portion to which a contact terminal is coupled, and a switch portion formed more inwards in a longitudinal direction than the terminal portion, and a shell coupled to the housing to form a receiving space of the card tray. The shell may include a sensing portion which is extended from the shell to sense insertion of the card tray into the card socket, and a coupling portion which is extended downward from the shell in a height direction to be inserted into the switch portion.

According to an embodiment, the sensing portion may have a shape extended downward from the shell in the height direction and then extended upward in the height direction. The switch portion may include a stopper which is configured to come into contact with an upper surface of the sensing portion and to prevent the sensing portion from being lifted up in the height direction. The terminal portion may include a first terminal portion which is formed on one side in a width direction and has a first terminal disposed therein, and a second terminal portion which is formed on the other side of the housing in the width direction and has a second terminal and a third terminal disposed therein.

According to an embodiment, the card tray may include a first frame portion which is formed on one side in the width direction, and is configured to come into contact with the sensing portion when being inserted into the receiving space, and a second frame portion which is formed on the other side in the width direction.

According to an embodiment, the first frame portion may be configured to have a shorter length than the second frame in the longitudinal direction of the card tray, and an inward leading end of the second frame portion may be formed more inwards than an inward leading end of the first frame portion.

According to an embodiment, a card of a first type may be received in the first frame portion, and one or more cards of a second type which are smaller than the card of the first type may be received in the second frame portion.

According to an embodiment, the second frame portion may include a second-a frame portion and a second-b frame portion which are arranged in parallel with each other in the longitudinal direction of the card tray.

According to an embodiment, the card socket may further include a hinge installed inwards in the longitudinal direction of the switch portion, and an eject bar installed to be slidable in the housing along the longitudinal direction and configured to dismount the card tray from the card socket when coming into contact with the hinge.

According to embodiments of the present disclosure, when the card tray is inserted into the card socket in the multi card connector for the SIM card and the SD card installed in the mobile communication terminal, the sensing portion extended from the shell of the card socket comes into contact with the switch extended from the bottom of the housing of the card socket, and detects an insertion state of the card tray. Therefore, a process of fabricating a separate sensing portion and installing the same in a housing is omitted and a manufacturing cost and manufacturing time can be reduced. In addition, since the coupling portion extended from the sensing portion is inserted into the bottom of the housing, swelling-up of the housing shell caused by a contact resistance between a card and a terminal can be prevented, and deformation of the card socket caused by repeatedly mounting and dismounting the card tray multiple times can be prevented. In addition, since the sensing portion is formed adjacent to the hinge in the width direction of the card socket, the length of the card socket can be reduced, and thus a space occupied by the card connector in the mobile communication terminal can be more efficiently used.

DETAILED DESCRIPTION OF PREFERRED EMBODIMENTS

Figure 1:
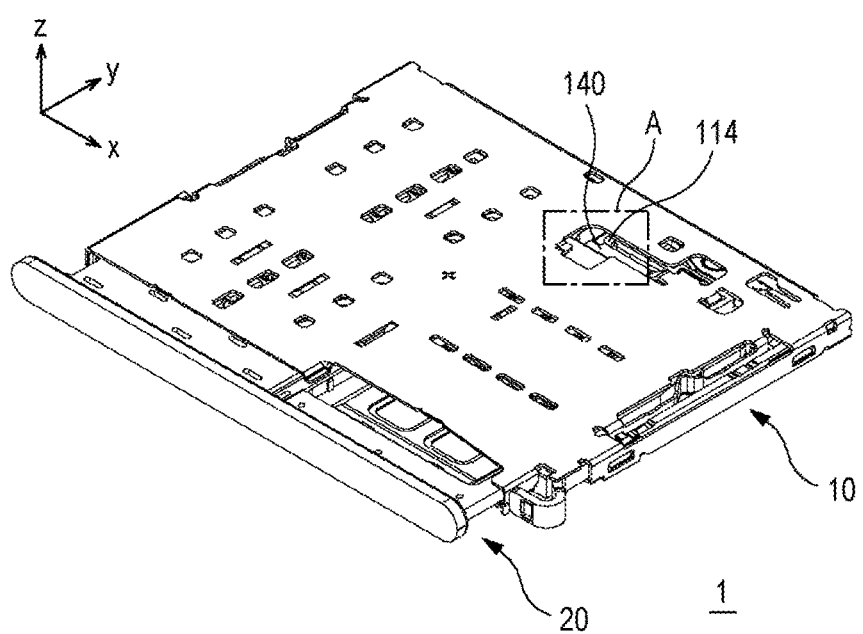
FIG. 1 is a perspective view illustrating a card socket according to an embodiment of the present disclosure.

Embodiments of the present disclosure are exemplified for the purpose of explaining the technical concept of the present disclosure. The right scope of the present disclosure is not limited to embodiments suggested hereinbelow or detailed descriptions of these embodiments.

Unless otherwise defined herein, all technical terms and scientific terms used in the present disclosure may have the meanings that are generally understood by a person skilled in the art to which the present disclosure belongs. All terms used in the present disclosure are selected for the purpose of explaining the present disclosure more clearly, and are not selected to limit the right scope of the present disclosure.

The expressions "include," "provided with," "has," etc. used in the present disclosure should be understood as open-ended terms implying the possibility of including other embodiments unless the phrase or sentence including the corresponding expression indicates otherwise.

The singular forms described in the present disclosure may include the plural forms as well, unless the context clearly indicates otherwise, and this is equally applied to the singular forms described in the claims.

The expressions such as "first," "second," etc. used in the present disclosure may be used to simply distinguish a plurality of components from one another, and do not limit the order or importance of the corresponding components.

In the present disclosure, it should be understood that if an element is referred to as "coupled to" or "connected to" another element, it means that the element may be directly coupled or connected to another element, or via another new element.

The direction indicating terms such as "upper portion," "upper," etc. used in the present disclosure refer to a direction of a shell positioned with respect to a housing in the accompanying drawings, and the direction indicating terms such as "lower portion, "lower," etc. refer to the opposite direction thereof. The shell and the housing illustrated in the accompanying drawings may be orientated differently, and the direction indicating terms described above may be interpreted accordingly.

The coordinates system illustrated in the drawings of the present disclosure shows an X-axis, a Y-axis, and a Z-axis. The X-axis direction refers to a direction which is parallel to a width direction of a card connector, the Y-axis direction refers to a direction which is parallel to a longitudinal direction of the card connector, and the Z-axis direction refers to a direction which is parallel to a height direction of the card connector. In addition, the (+) direction of the X-axis refers to one side of the width direction, and the (−) direction refers to the other side of the width direction. In addition, the (+) direction of the Y-axis refers to a direction indicating the inside in the longitudinal direction, and the (−) direction refers to a direction indicating the outside in the longitudinal direction. In addition, the (+) direction of the Z-axis refers to an upper side in the height direction, and the (−) direction refers to a lower side in the height direction.

Hereinafter, embodiments of the present disclosure will be described with reference to the accompanying drawings. In the accompanying drawings, the same reference numerals are used for the same or corresponding elements. In addition, in explaining the following embodiments, redundant descriptions of the same or corresponding elements will be omitted. However, even if the description of an element is omitted, it is not intended that such an element is not included in a certain embodiment.

Figure 2:
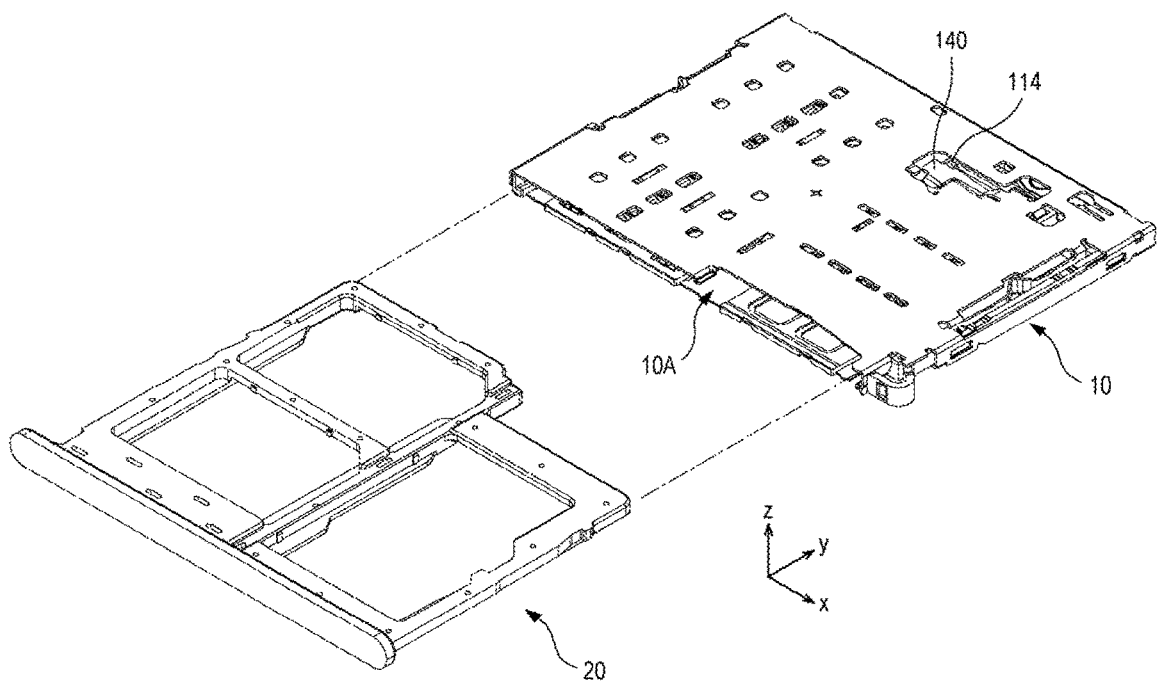
FIG. 2 is a perspective view illustrating a card socket and a card tray which are separated from the card connector shown in FIG. 1.

FIG. 1 is a perspective view illustrating a card connector 1 according to an embodiment of the present disclosure, and FIG. 2 is a perspective view illustrating a card socket 10 and a card tray 20 which are separated from the card connector 1 shown in FIG. 1.

The card connector 1 is a device which is configured to electrically connect a mobile communication terminal (not shown) and a card (not shown). The card connector 1 may include the card socket 10 and the card tray 20 inserted thereinto. The card socket 10 may be installed to be fixed to the mobile communication terminal (not shown), and an exterior of the card socket 10 may be surrounded by the mobile communication terminal (not shown). For example, the card socket 10 may be fixed onto an electronic circuit board (printed circuit board (PCB)) (not shown) disposed inside the mobile communication terminal (not shown). The card tray 20 may be inserted into an opening 10A of the card socket 10 to be removably coupled to the card socket 10. The card socket 10 may provided with a sensing portion 140 configured to sense insertion of the card tray 20, and a stopper 114 configured to prevent the sensing portion 140 from being lifted up in the height direction (Z direction).

The mobile communication terminal (not shown) may download information stored in a card (not shown), or may upload new information into the card (not shown). The mobile communication terminal (not shown) may be various devices such as a computer, a mobile phone, a home appliance, a dashboard camera, a closed circuit television (CCTV), or the like. The card (not shown) may be a SIM card, an SD card, or other memory cards.

As the SIM card, a USIM card may be used. The USIM employs a standard method forming to global system for mobile communication (GSM), and a USIM card having a USIM mounted therein corresponds to a new version SIM card distinct from the initially developed SIM card. The USIM card may be classified into a standard SIM card, a mini SIM card, a micro SIM card, a nano SIM card, the sizes of which are gradually reduced.

The SD card has a flash memory card format to be used in a portable mobile communication terminal, and may employ a secure digital high capacity (SDHC) method, a secure digital extended capacity (SDXC) method, a secure digital input output (SDIO) method according to a storage method of information. The SD card may be classified into a standard SD card, a mini SD card, a micro SD card, the sizes of which are gradually reduced.

The card connector 1 may be referenced as "3 in 3 type" which can use a plurality of cards, for example, three cards (not shown). For example, the card tray 20 may receive three cards (not shown) including two nano SIM cards and one micro SD card. When the card tray 20 is inserted into the card socket 10 with three cards (not shown) being received in the card tray 20, terminals of the three cards (not shown) may come into contact with terminals formed in the card socket 10, respectively. The terminals formed in the card socket 10 will be described below in detail.

Figure 3:
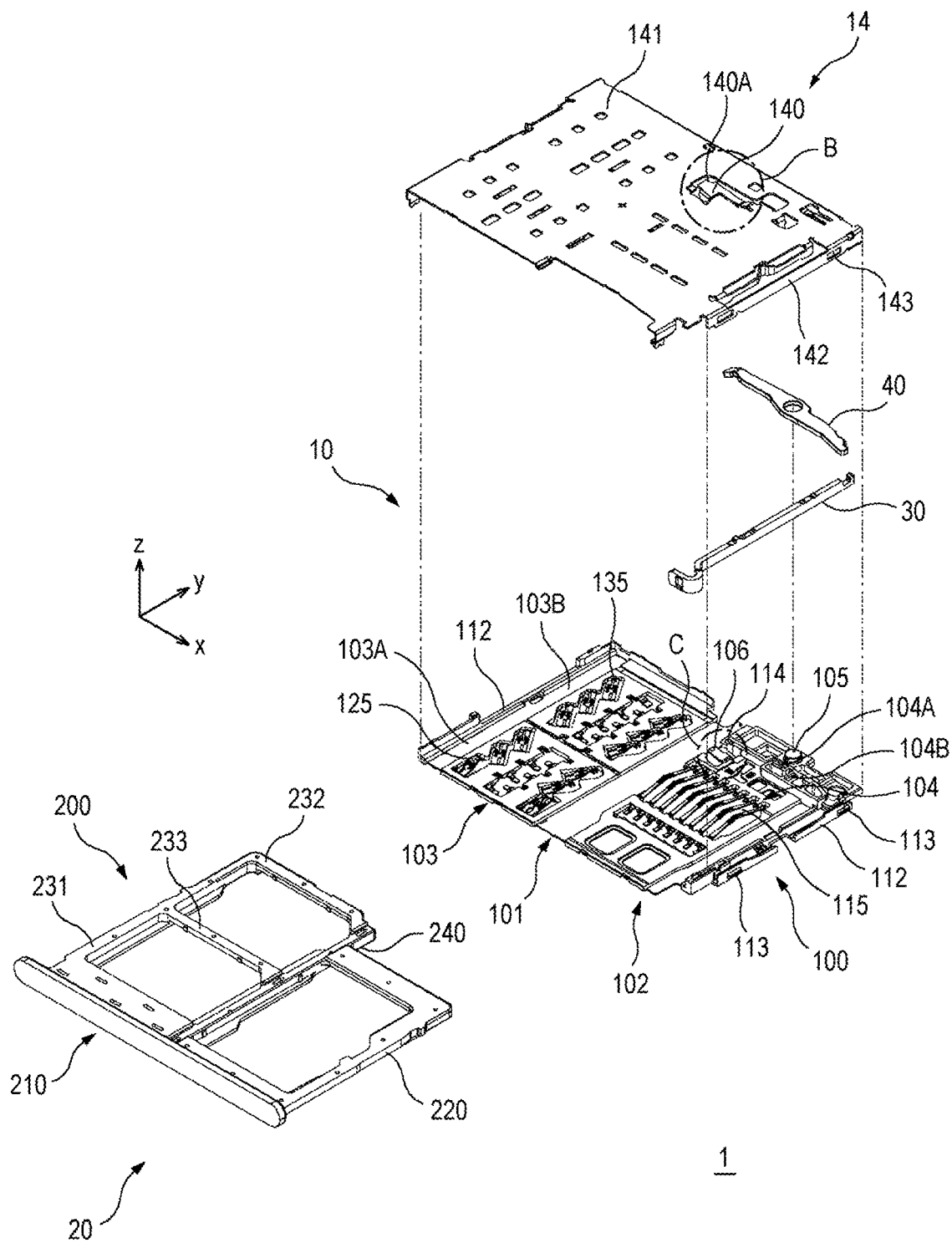
FIG. 3 is an exploded perspective view of the card connector according to an embodiment of the present disclosure.
Figure 4A:
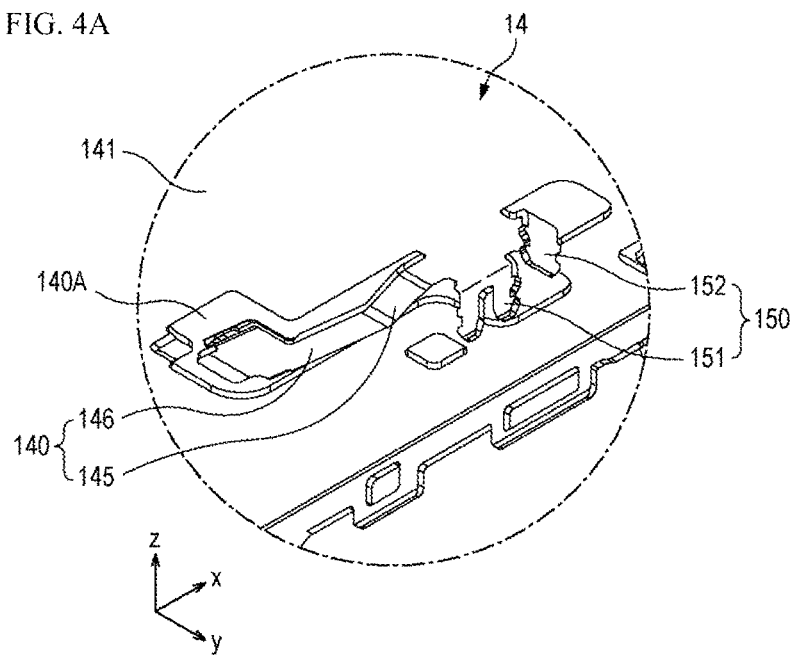
FIGS. 4A and 4B are perspective views illustrating a configuration of a sensing portion shown in FIG. 3 as viewed from below, and a configuration of a switch portion of a housing.
Figure 4B:
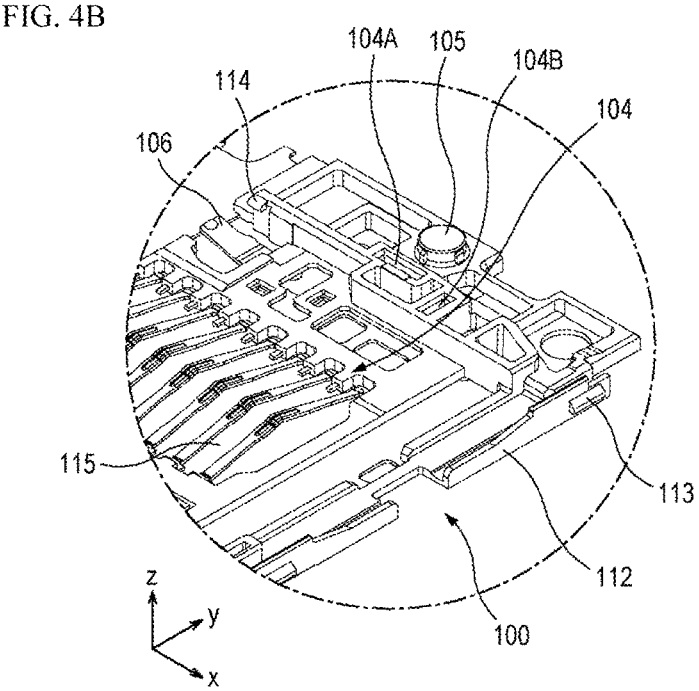

FIGS. 3, 4A and 4B are exploded perspective views of the card socket 10 of the card connector 1 according to an embodiment of the present disclosure. FIGS. 4A and 4B are perspective views illustrating a configuration of the sensing portion 140 shown in FIG. 3 as viewed from below, and a configuration of a switch portion of a housing. FIG. 4A illustrates the configuration of the sensing portion 140, and FIG. 4B illustrates the configuration of the switch portion.

The card socket 10 may include the housing 100 to which first to third terminals 115, 125, 135 are coupled, a shell 14 coupled to the housing 100, a hinge 40 installed on one side of the housing 100, and an eject bar 30 installed on the housing 100 to be slidable.

The first to third terminals 115, 125, 135 may be formed with a conductive copper alloy material, but are not limited hereto and other metallic materials having conductivity may be substituted. The first to third terminals 115, 125, 135 may include a plurality of contact terminals, and may be fabricated by a pressing process. The first to third terminals 115, 125, 135 may protrude toward the shell 14, and may be electrically connected with terminals of a card (not shown).

The housing 100 may be integrally formed with the first to third terminals 115, 125, 135 by being insert-injected from a molding material in a mold (not shown) in which the first to third terminals 115, 125, 135 are disposed. The molding material forming the housing 100 may include a liquid crystal polymer (LCP) material, but is not limited hereto and a nonmetallic material having non-conductivity may be substituted. The housing 100 may include a bottom portion 101 and a sidewall 112 formed along the border of the bottom portion 101. A plurality of coupling protrusions 113 may be formed on an outer surface of the sidewall 112.

The housing 100 may have a terminal portion formed therein. The terminal portion may include a first terminal portion 102 formed on one side in the width direction (X direction) and having first terminals 115 arranged therein, a second terminal portion 103 formed on the other side in the width direction (X direction) and having second and third terminals 125, 135 arranged therein, and the switch portion 104 formed inside the first terminal portion 102 in the longitudinal direction (Y direction).

The switch portion 104 may include a switch 106 extended upward in the height direction (Z direction). The switch 106 may be extended toward the second terminal portion 103. In addition, a boss portion 105 may be formed at an inward position of the switch portion 104 to be used as a rotary axis of the hinge 40. When the eject bar 30 comes into contact with the hinge 40, the hinge 40 may rotate about the boss portion 105.

The second terminal portion 103 includes a second-a terminal portion 103A having the second terminals 125 formed therein, and a second-b terminal portion 103B having the third terminals 135 formed therein. The second-b terminal portion 103B may be disposed more inwards in the longitudinal direction (Y direction) than the second-a terminal portion 103A. In addition, an inward leading end of the first terminal portion 102 in the longitudinal direction (Y direction) may be formed more inwards than an inward leading end of the second-a terminal portion 103A in the longitudinal direction. For example, the inward leading end of the first terminal portion 102 may be formed on substantially a middle point of the second-b terminal portion 103B. Accordingly, as shown in FIG. 3, a space may be provided on the inward leading end of the first terminal portion 102 of the housing 100 in the longitudinal direction (Y direction) to allow the switch portion 104 to be formed therein.

The shell 14 may be coupled with the housing 100 to form a receiving space therein. The shell 14 may be formed with STS 304, but is not limited hereto and other metallic materials may be substituted. The shell 14 may be fabricated by a pressing process. The shell 14 may include an upper wall 141 and a sidewall 142 vertically extended from the upper wall 141. The sidewall 142 may have a plurality of openings 143 formed thereon. The coupling protrusions 113 formed on the sidewall 112 of the housing 100 are inserted into the openings 143 formed on the sidewall 142 of the shell 14, such that the shell 14 is coupled to the housing 100.

The shell 14 may include the sensing portion 140 extended from the upper wall 141 toward the switch portion 104 of the housing 100. When the card tray 20 comes into contact with the sensing portion 140, the sensing portion 140 may be configured to move down in the height direction (Z direction) and to come into contact with the switch 106. The sensing portion 140 may have a shape that starts from the upper wall 141 of an opening 140A and is extended from one side in the width direction (X direction) toward the other side in the width direction (X direction).

The sensing portion 140 may have a shape that is extended downward from the upper wall 141 in the height direction (Z direction) and then is extended upward in the height direction (Z direction). The sensing portion 140 may include a first extension portion 145 which is formed to be extended from the upper wall 141 in the width direction (X direction) and to move down in the height direction (Z direction), and a second extension portion 146 which is extended from the first extension portion 145 in the width direction (X direction) and is extended upward in the height direction (Z direction). That is, the sensing portion 140 may have a substantially V shape when viewed from a side surface (X-Z plane).

Since the second extension portion 146 is extended toward the upside in the height direction (Z direction), a leading end of the second extension portion 146 may come out of the opening 140A as long as there is no other element. To prevent this, the switch portion 104 may include the stopper 114 which is configured to come into contact with an upper surface of the sensing portion 140 and to prevent the sensing portion 140 from being lifted up in the height direction (Z direction).

The stopper 114 may be formed adjacent to the switch 106 within the switch portion 104. The stopper 114 may be formed at a position spaced apart from the bottom of the housing 100 by a predetermined distance. The stopper 114 may have a shape extended outward in the longitudinal direction (Y direction). The stopper may come into contact with an upper surface of the second extension portion 146 of the sensing portion 140 to prevent the second extension portion 146 from being excessively lifted up.

The shell 14 may include a coupling portion 150 to prevent the upper wall 141 from swelling up when the card tray 20 is inserted into the card socket 10. The coupling portion 150 may include a first coupling portion 151 formed in parallel with the width direction (X direction), and a second coupling portion 152 formed in parallel with the longitudinal direction (Y direction). Referring to FIG. 3, the switch portion 104 may include a first receiving portion 104A into which the first coupling portion 151 is inserted, and a second receiving portion 104B into which the second coupling portion 152 is inserted. A detailed description thereof will be provided below.

The card tray 20 may include a frame 200 and a mold 210 formed on one side of the frame 200. The frame 200 may include a first frame portion 220 which is formed on one side with reference to the width direction (X direction) and is configured to come into contact with the sensing portion 140 when being inserted into the receiving space of the card socket 10, and a second frame portion 230 which is formed on the other side with reference to the width direction (X direction). For example, the first and second frame portions 220, 230 may have a shape which is extended from a middle frame portion 240 toward both sides in the width direction (X direction).

Referring to FIGS. 3, 4A and 4B, a length of the first frame portion 220 in the longitudinal direction (Y direction) of the card tray may be shorter than a length of the second frame portion 230. That is, an inward leading end of the second frame portion 230 may be formed more inwards than an inward leading end of the first frame portion 220. In addition, the inward leading end of the first frame portion 220 may be configured to come into contact with the sensing portion 140.

A card of a first type (not shown) may be received in the first frame portion 220, and a card of a second type (not shown) which is smaller than the card of the first type (not shown) may be received in the second frame portion 230. Two cards of the second type (not shown) may be received in the second frame portion 230. To achieve this, the second frame portion 230 may include a second-a frame portion 231 and a second-b frame portion 232 which are arranged in parallel with the width direction (X direction). A second-c frame portion 233 may be formed between the second-a frame portion 231 and the second-b frame portion 232 to distinguish them from each other.

For example, the card of the first type (not shown) may include a micro SD card. In addition, the two cards of the second type (not shown) may include nano SIM cards, respectively. Accordingly, since three cards (not shown) can be received in the card connector 1, a user can secure an additional memory in addition to a memory embedded in the mobile communication terminal (not shown), and may provide two SIM cards which can be used in other countries, such that the user does not have inconvenience of having to have local SIM cards even when the user moves to other countries.

Figure 5:
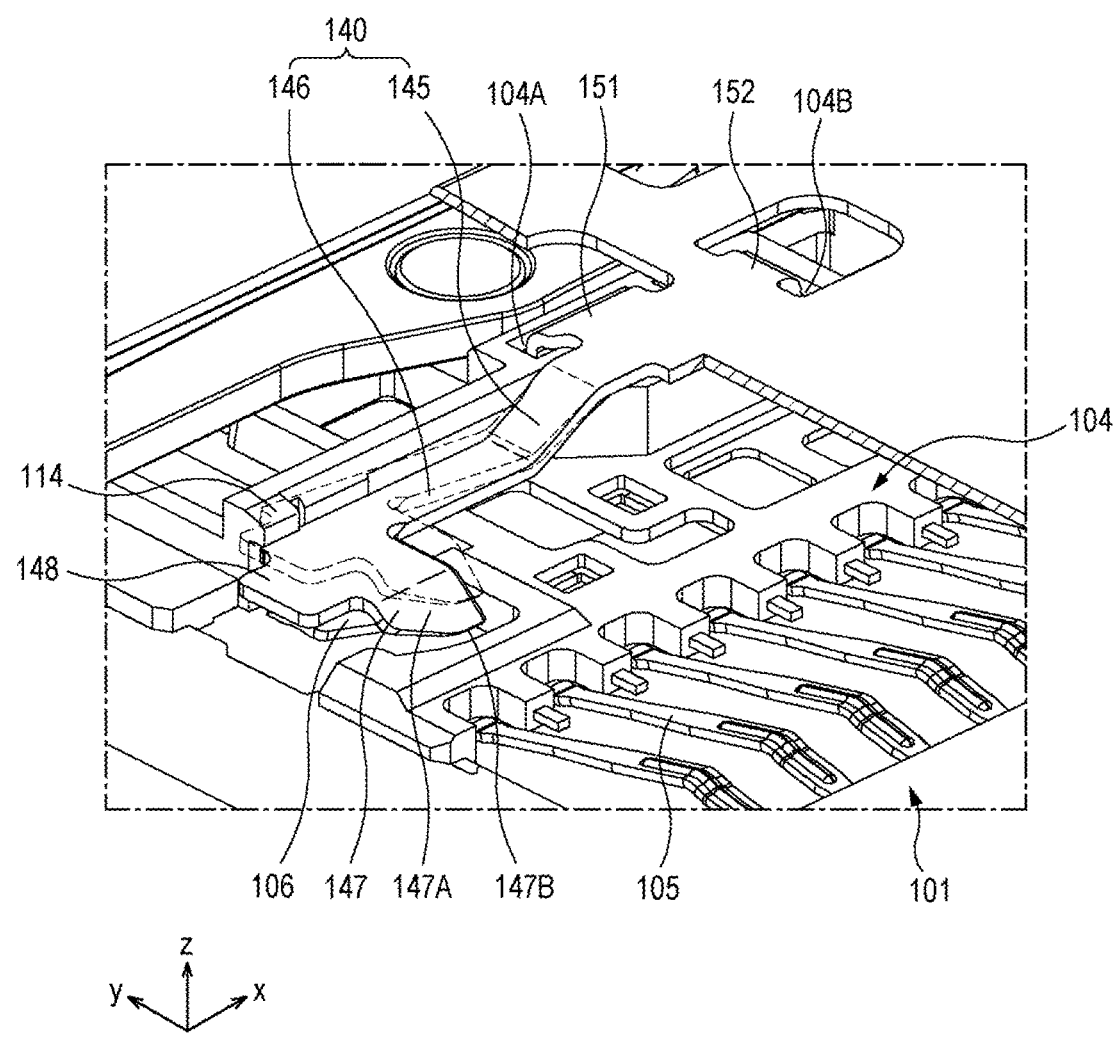
FIG. 5 is an enlarged view enlarging an inner configuration of the portion A displayed on FIG. 1.
Figure 6:
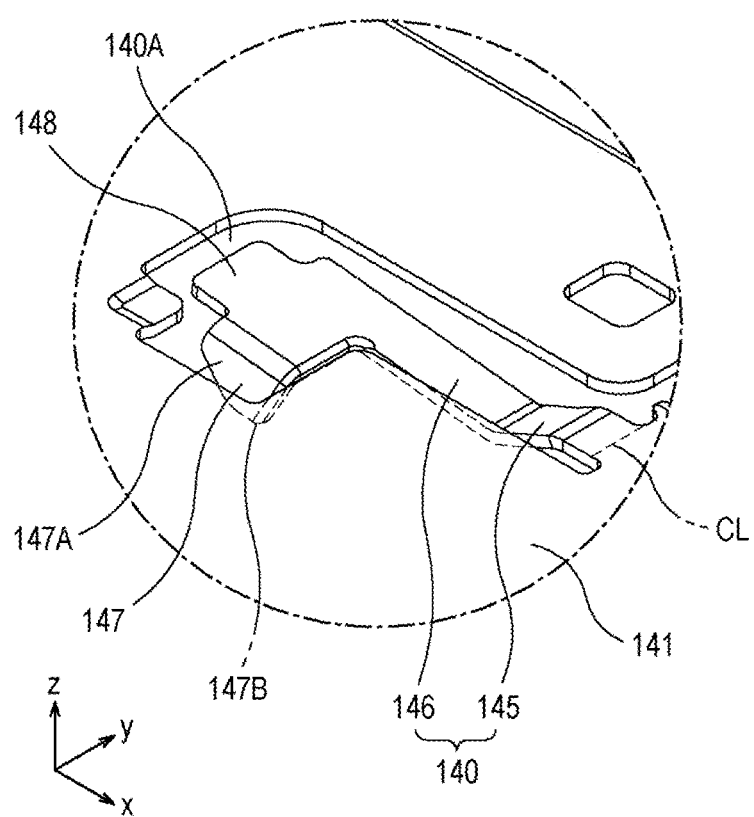
FIG. 6 is an enlarged view enlarging the portion B displayed on FIG. 3.
Figure 7:
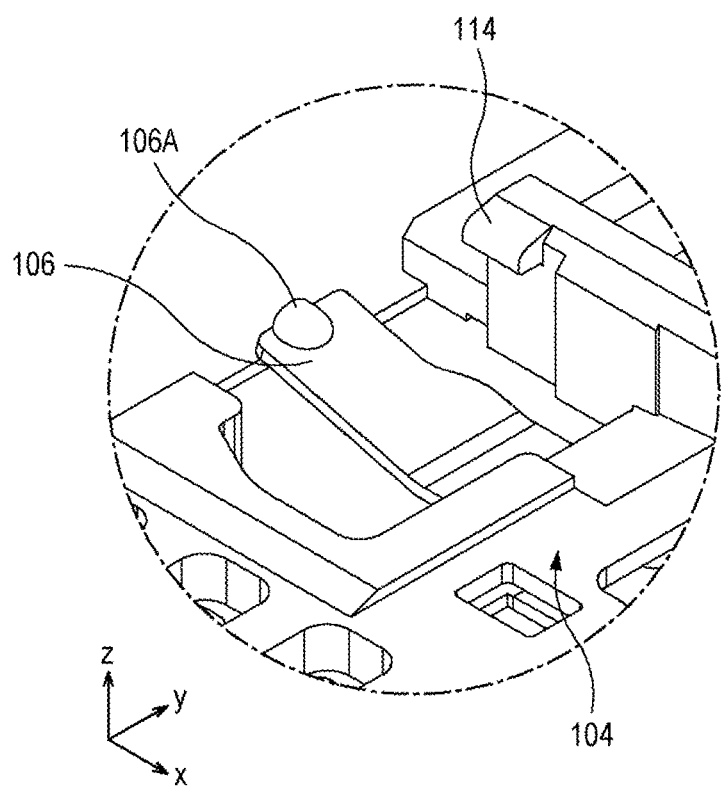
FIG. 7 is an enlarged view enlarging the portion C displayed on FIG. 3.

FIG. 5 is an enlarged view enlarging an inner configuration of the portion A displayed on FIG. 1. FIG. 6 is an enlarged view enlarging the portion B displayed on FIG. 3. FIG. 7 is an enlarged view enlarging the portion C displayed on FIG. 3.

Referring to FIG. 6, the sensing portion 140 may include the first extension portion 145 which is extended from a boundary CL formed on one side of the opening 140A toward the other side in the width direction (X direction), the second extension portion 146 which is further extended from the first extension portion 145 toward the other side in the width direction (X direction), and an inclined portion 147 which is extended outward from the second extension portion 146 in the longitudinal direction (Y direction). The inclined portion 147 may be formed to be inclined toward the switch portion 104. Referring to FIG. 1, when the assembly of the card connector 1 is completed, a leading end 147B of the inclined portion 147 may be hidden inside the housing.

When the card tray 20 is inserted into the card socket 10, an inward leading end of the card tray 20 in the longitudinal direction (Y direction) (for example, an inward leading end of the first frame portion 220) comes into contact with an inclined surface 147A of the inclined portion 147, thereby moving the sensing portion 140 down toward the switch portion 104 in the height direction (Z direction).

Referring to FIG. 5, right after the shell 14 is coupled to the housing 100, the second extension portion 146 of the sensing portion 140 may be positioned over the stopper 114 as indicated by the dashed line. Thereafter, when the sensing portion 140 is pressed down in the height direction (Z direction), the second extension portion 146 of the sensing portion 140 moves down in the height direction (Z direction) of the stopper 114 as indicated by the solid line. In this state, the second extension portion 146 exerts a force of pushing the stopper 114 upward in the height direction (Z direction), and in reaction thereto, the stopper 114 exerts a force of pushing the second extension portion 146 downward in the height direction (Z direction). Accordingly, a pre-load is exerted to the second extension portion 146 by the stopper 114.

FIG. 5 illustrates a state before the card tray 20 is inserted into the card socket 10. In this state, the second extension portion 146 of the sensing portion 140 illustrated in the solid line may have a shape which is parallel with the upper wall 141 of the shell 140, or may have a shape which faces up in the height direction (Z direction). However, the second extension portion 146 before the card tray 20 is inserted is pressed by the stopper 114 while being extended upward in the height direction (Z direction). Thereafter, when the card tray 20 is inserted, the inclined portion 147 may be pressed by the card tray 20 and the second extension portion 146 may face down in the height direction (Z direction).

Accordingly, even when the shell 14 bulges up in the height direction (Z direction) or is concave down in the height direction (Z direction), the sensing portion 140 may perform its own function without deformation of the sensing portion 140. When the shell 14 bulges up in the height direction (Z direction), the stopper 114 may precess the second extension portion 146, thereby preventing the sensing portion 140 from being lifted up. In addition, even before the card tray 20 is inserted, the second extension portion 146 is extended upward in the height direction (Z direction). Therefore, even when the shell 14 is concave down in the height direction (Z direction), the sensing portion 140 does not come into contact with the switch 106 positioned thereunder in the height direction (Z direction), and thus a short circuit can be prevented. Accordingly, the height (Z axis) of the sensing portion 140 can be always constantly maintained regardless of whether the shell 14 is deformed (bulges up in the height direction (Z direction) or is concave down), and a short circuit with the switch 106 can be prevented.

Referring to FIG. 7, the switch 106 may have a shape which is extended from the switch portion 104 toward the other side in the width direction (X direction). A protrusion 106A having a curved surface may be formed on a leading end of the switch 106. The protrusion 106A may be configured to come into contact with a lower surface of a contact portion 148 formed on a leading end of the second extension portion 146 of the sensing portion 140 in the longitudinal direction (Y direction) when the sensing portion 140 moves down in the height direction (Z direction). In this case, the sensing portion 140 may transmit a signal indicating that the card tray 20 is inserted into the card socket 10 to a controller of the mobile communication terminal (not shown). Since the protrusion 106A protrudes upward in the height direction (Z direction), a contact property between the switch 106 and the sensing portion 140 can be enhanced.

Since the sensing portion 140 is extended from the upper wall 141 of the shell 14, a cost for separately fabricating the sensing portion 140 and mounting the same in the housing 100 can be saved. That is, the sensing portion 140 may be integrally formed with the upper wall 141 of the shell 14 in the process of fabricating the shell 14 by pressing.

In addition, since the sensing portion 140 is extended from the upper wall 141 of the shell 14, a restoring force acting upward in the height direction (Z direction) may be exerted to the sensing portion 140 even when the sensing portion 140 moves down in the height direction (Z direction) due to the contact with the card tray 20. Accordingly, even when the card tray 20 is mounted in and dismounted from the card socket 10 multiple times, the sensing portion 140 may not be formed and may maintain its original shape.

Figure 8:
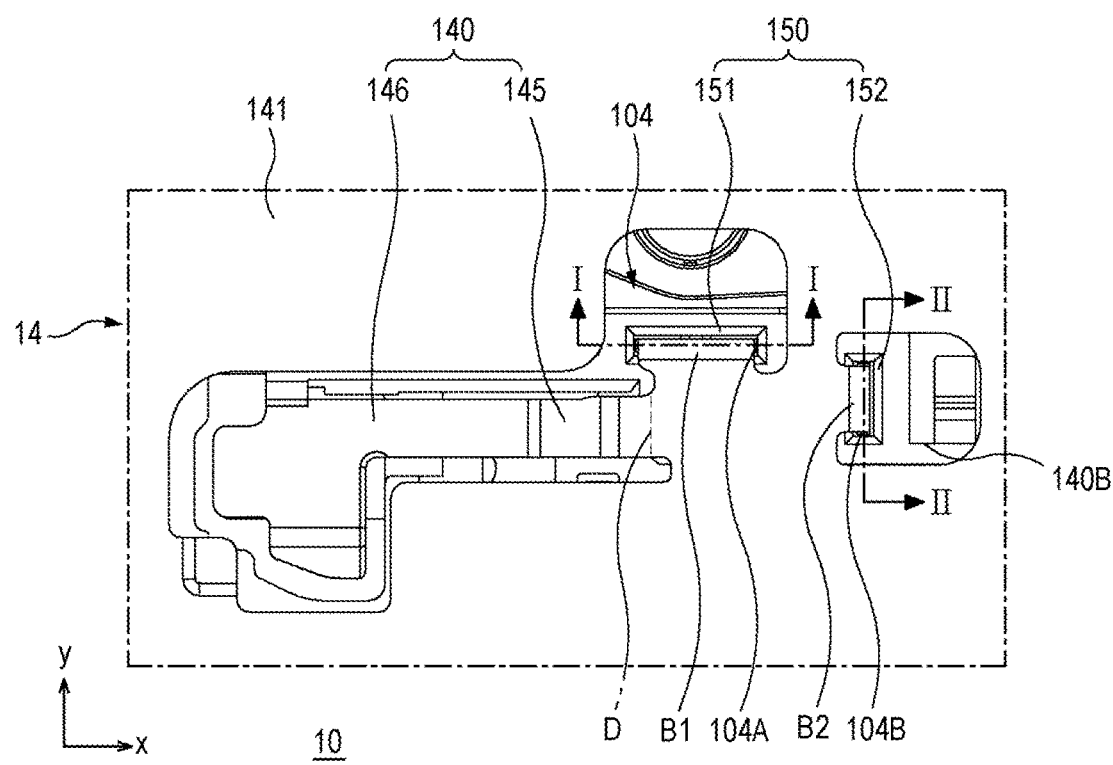
FIG. 8 is a top view of the portion A displayed on FIG. 1 as viewed from above.

FIG. 8 is a top view of the portion A displayed on FIG. 1 as viewed from above. FIG. 9 is a cross-sectional view of the coupling portion 150 shown in FIG. 8, taken on line I-I and line II-II. Hereinafter, a structure of the coupling portion 150 which can prevent the shell 14 from swelling up will be described.

Figure 9A:
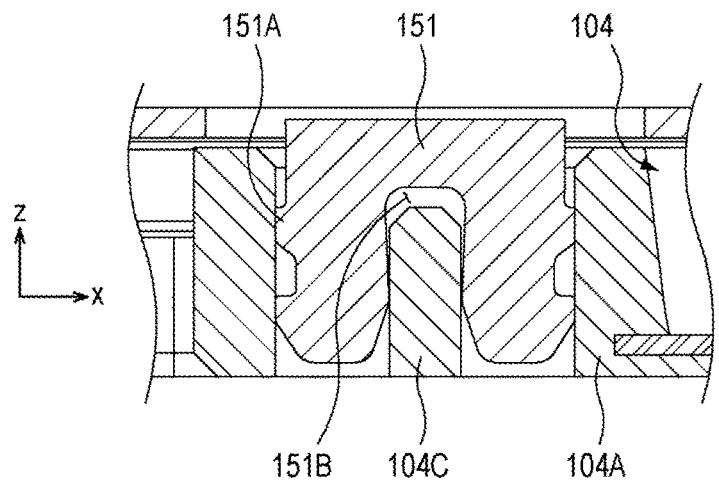
FIGS. 9A and 9B are cross-sectional views of a coupling portion shown in FIG. 8, taken on line I-I and line II-II.
Figure 9B:
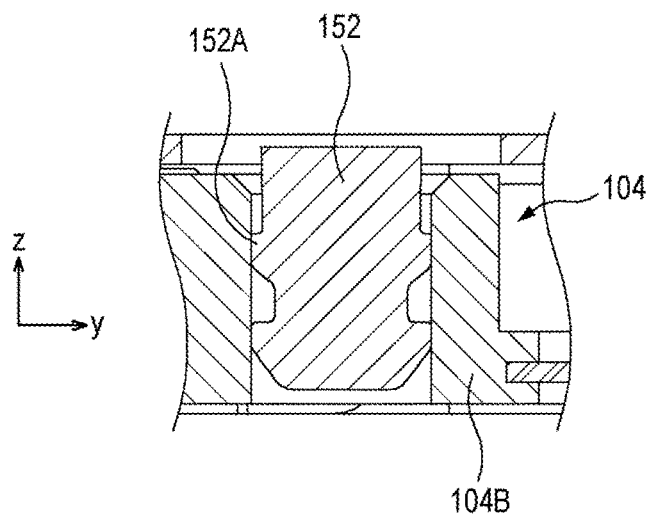

Referring to FIG. 9A and FIG. 9B, the shell 14 may include the coupling portion 150 extended downward from the upper wall 141 in the height direction (Z direction) to be inserted into the switch portion 104. The coupling portion 150 may include a first coupling portion 151 which is extended from a first connection portion B1 formed on an inward position of the opening 140A, and a second coupling portion 152 which is extended from a second connection portion B2 formed on the other side of an opening 140B. A direction (X direction) passing through the width of the first connection portion B1, and a direction (Y direction) passing through the width of the second connection portion B2 may be perpendicular to each other.

The switch portion 104 may include the first receiving portion 104A into which the first coupling portion 151 is inserted, and the second receiving portion 104B into which the second coupling portion 152 is inserted. The first and second coupling portions 151, 152 may have such a structure that the first and second coupling portions 151, 152 are not easily released after being inserted into the first and second receiving portions 104A, 104B. The first and second coupling portions 151, 152 may have shapes different from one another.

Referring to FIG. 9A, the first coupling portion 151 may have an inclined shape (that is, a wedge shape) to come into contact with an inner surface of the first receiving portion 104A. The first coupling portion 151 may include wedge portions 151A extended from both sides thereof in the width direction (X direction). A plurality of wedge portions 151A may be provided and may come into contact with the inner surface of the first receiving portion 104A. In addition, the first coupling portion 151 may have a recess 151B formed therein to have a part of the switch portion 104, that is, an insertion portion 104C, inserted thereinto. In this case, an inner surface of the first coupling portion 151 may come into contact with an outer surface of the insertion portion 104C.

Since a width of the first coupling portion 151 including the wedge portions 151A is slightly larger than a width of the first receiving portion 104A, interference may be caused between the wedge portions 151A and the first receiving portion 104A, and thus a friction between the first coupling portion 151 and the inner surface of the first receiving portion 104A may be increased. In addition, the first coupling portion 151 has a structure having both the outer surface and the inner surface come into contact with the first receiving portion 104A. Accordingly, when an external force is exerted to the first coupling portion 151 upwardly in the height direction (Z direction), the friction between the first coupling portion 151 and the first receiving portion 104A is exerted downward in the height direction (Z direction), such that the first coupling portion 151 is not easily released from the first receiving portion 104A.

Referring to FIG. 9B, the second coupling portion 152 may have an inclined shape (that is, a wedge shape) to come into contact with an inner surface of the second receiving portion 104B. The second coupling portion 152 may include wedge portions 152A extended from both sides thereof in the longitudinal direction (Y direction). A plurality of wedge portions 152A may be provided and may come into contact with the inner surface of the second receiving portion 104B.

Since a width of the second coupling portion 152 including the wedge portions 152A is slightly larger than a width of the second receiving portion 104B, interference may be caused between the wedge portions 152A and the second receiving portion 104B, and thus a friction between the second coupling portion 152 and the inner surface of the second receiving portion 104B may be increased. Accordingly, when an external force is exerted to the second coupling portion 152 upwardly in the height direction (Z direction), the friction between the second coupling portion 152 and the second receiving portion 104B is exerted downward in the height direction (Z direction), such that the second coupling portion 152 is not easily released from the second receiving portion 104B.

Hereinafter, a swelling-up phenomenon of the shell 14 of the card socket 10 and an operation of the coupling portion 150 to prevent this phenomenon will be described with reference to the configuration described in FIGS. 8, 9A and 9B and FIGS. 3, 4A and 4B. One first card (not shown) may be received in the first frame portion 220 of the card tray 20, and two second cards (not shown) may be received in the second frame portion 230. Accordingly, when the two second cards (not shown) come into contact with the second terminals 125 and the third terminals 135, the upper wall 141 of the shell 14 may swell up in the height direction (Z direction) and may be bent due to a contact resistance between the terminals of the two second cards (not shown), and the second terminals 125 and the third terminals 135. In addition, when the first card (not shown) comes into contact with the first terminals 115, the upper wall 141 of the shell 14 may swell up in the height direction (Z direction) and may be bent due to a contact resistance between the terminals of the first card and the first terminals 115. The contact resistance caused by the two second cards (not shown) may be greater than the contact resistance caused by the first card (not shown).

There is a need for a configuration for retaining the sensing portion 140 by applying a force in the downward direction (Z direction) to prevent a change in height of the sensing portion 140 even when the upper wall 141 of the shell 14 swells up. When the upper wall 141 of the shell 14 starts to swell up in the height direction (Z direction), the above-described coupling portion 150 (FIGS. 9A and 9B) functions to prevent the sensing portion 140 from moving upward in the height direction (Z direction), and as a result, the height of the sensing portion 140 is not changed. Accordingly, even when the card tray 20 is mounted in and dismounted from the card socket 10 multiple times, contact performance of the sensing portion 140 and the switch 106 does not deteriorate and is constantly maintained.

Figure 10:
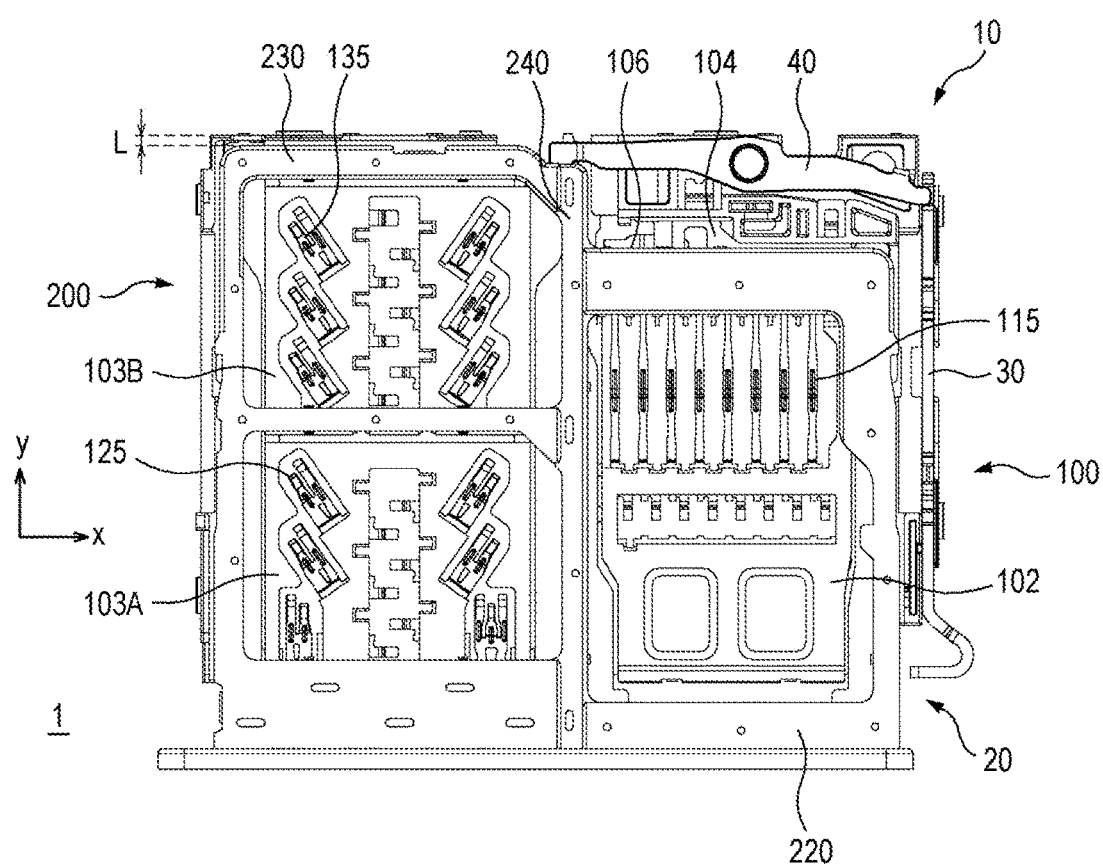
FIG. 10 is a top view illustrating the card connector of FIG. 1 from which a shell is removed.

FIG. 10 is a top view illustrating the card connector 1 of FIG. 1 from which the shell 14 is removed. A card (not shown) is not inserted into the card tray 20 shown in FIG. 10 for convenience of explanation.

When the eject bar 30 moves inwards in the longitudinal direction (Y direction) by an external force applied by a user, a leading end of the eject bar 30 may come into contact with one end of the hinge 40 and may rotate the hinge 40 in the counter clockwise direction (with reference to the state shown in FIG. 10). In this case, the other end of the hinge 40 may come into contact with an inward leading end of the middle frame portion 240, and may exert a force of pushing outward in the longitudinal direction to the card tray 20. Accordingly, the card tray 20 may be ejected from the card socket 10.

Referring to FIG. 10, the switch portion 104 may be disposed in an inward region of the first frame portion 220 in the housing 100. If the switch portion 104 is disposed in an inward region of the second frame portion 230 in the housing 100, the card socket 10 has no choice but to have a length increased as long as a length of the switch portion 104. According to an embodiment, since the switch portion 104 is not disposed in an inward region of the second frame portion 230, a difference L between the length of the housing 100 and the length of the frame 200 can be minimized. In addition, since the first terminal portion 102 is formed more outwards in the longitudinal direction (Y direction) than the switch portion 104, the length of the first frame portion 220 can be reduced.

Figure 11:
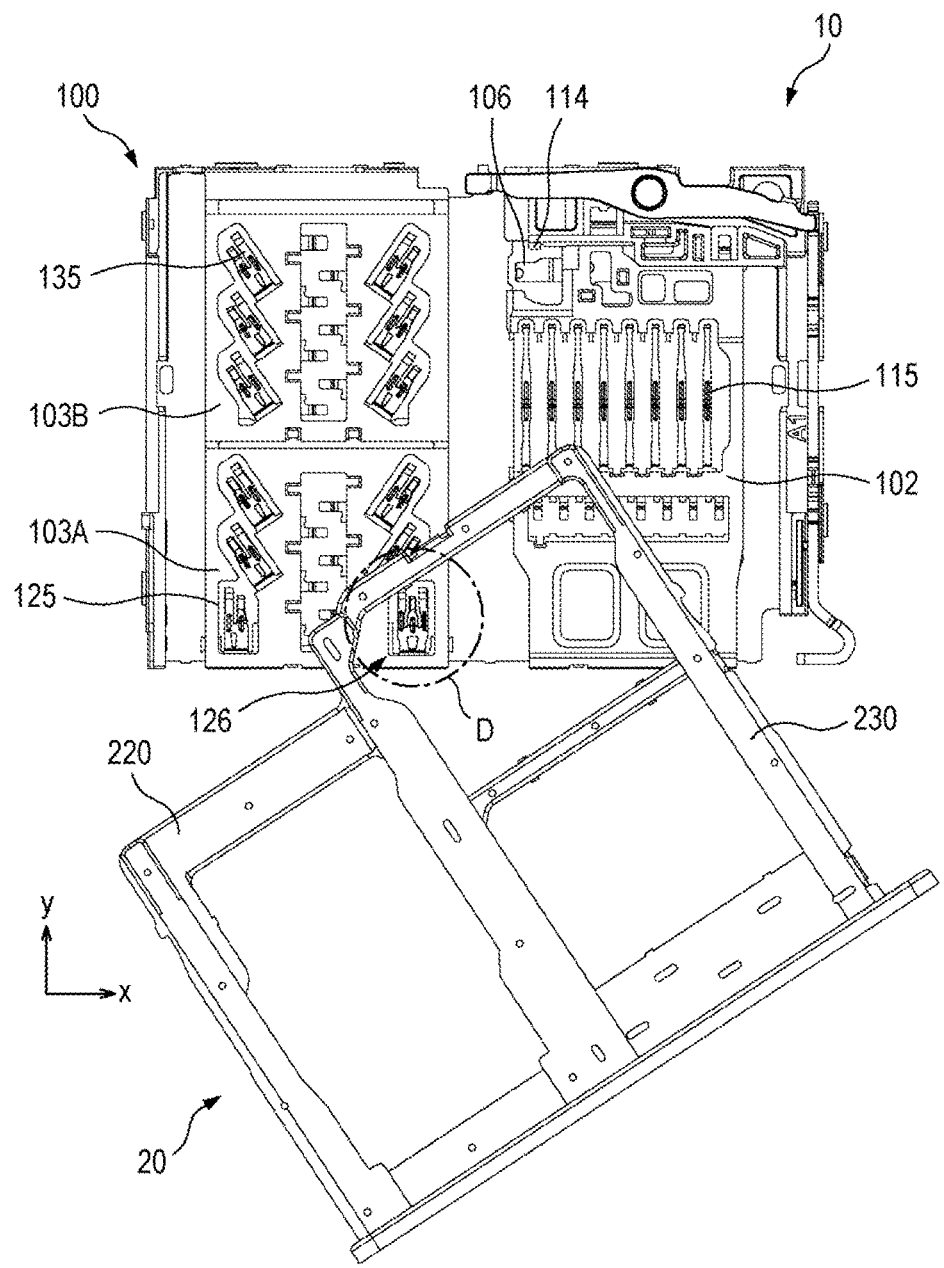
FIG. 11 is a top view illustrating a process of wrongly inserting the card tray into the card socket.
Figure 12:
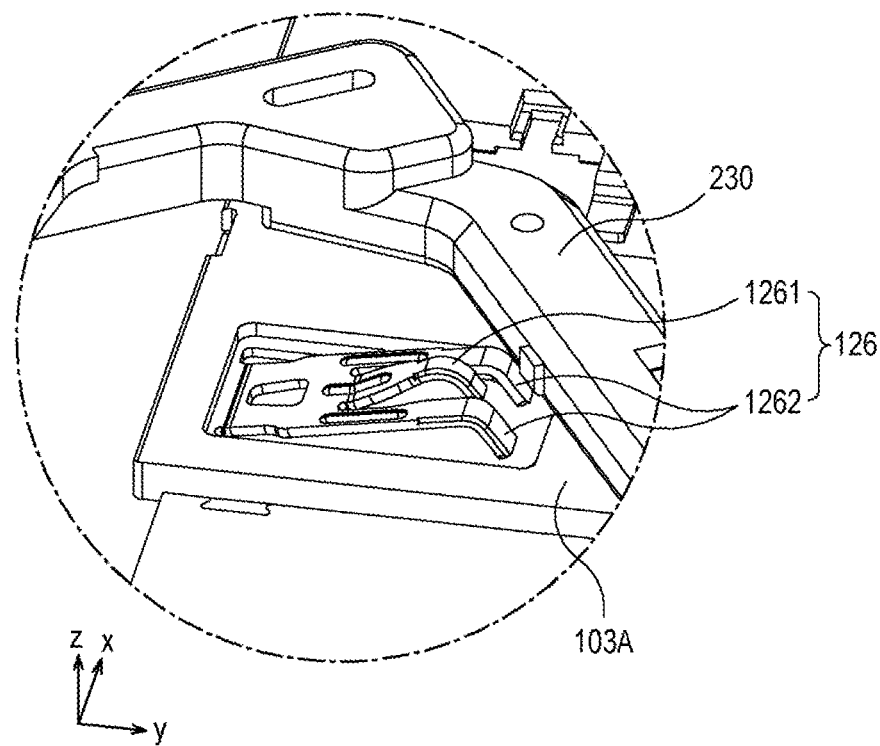
FIG. 12 is a perspective view enlarging the portion D displayed on FIG. 11.

FIG. 11 is a top view illustrating a process of dismounting the card tray 20 from the card socket 10 when the card tray 20 is wrongly inserted into the card socket (that is, the card tray 20 is turned over and is wrongly inserted), and then is drawn out again. FIG. 12 is a perspective view enlarging the portion D of FIG. 11. FIGS. 11 and 12 illustrate a state in which the shell 14 is removed from the card socket 10 for convenience of explanation.

The second terminals 125 formed in the second-a terminal portion 103A may be arranged in two rows along the longitudinal direction (Y direction). Likewise, the third terminals 135 formed in the second-b terminal portion 103B may be arranged in two rows along the longitudinal direction (Y direction).

The second terminals 125 may include a plurality of contact terminals, and a contact terminal 126 from among the plurality of contact terminals that is adjacent to the first terminal portion 102 and is positioned outside in the longitudinal direction (Y direction) may have a different configuration from those of the other contact terminals. The other contact terminals may be formed in two rows of a main contact terminal and a sub contact terminal. On the other hand, the contact terminal 126 may be formed in three rows, and may include a main contact terminal 1261, and sub contact terminals 1262 formed on both sides of the main contact terminal 1261 to have a maximum height lower than the main contact terminal 1261.

Referring to FIG. 11, when the card tray 20 is turned over and is wrongly inserted into the card socket 10, and then is drawn out again, an inner surface of the second frame portion 230 may come into contact with the contact terminal 126. If the contact terminal 126 is formed in two rows, the main contact terminal 1261 comes into contact with the inner surface of the second frame portion 230, first, and the main contact terminal 1261 may be damaged. In an embodiment, the contact terminal 126 is formed in two rows, the sub contact terminals 1262 come into contact with the inner surface of the second frame portion 230 before the main contact terminal 1261 does. Since the sub contact terminals 1262 have the maximum height lower than the main contact terminal 1261, the entire contact terminal 126 moves down in the height direction (Z direction) when the sub contact terminals 1262 come into contact with the inner surface of the second frame portion 230. Accordingly, the card tray 20 can be dismounted from the card socket 10 without deforming the main contact terminal 1261 by the second frame portion 230.

Although the technical concept of the present disclosure has been described based on some embodiments described above and examples shown in the accompanying drawings, it should be understood that various substitutions, modifications, and changes can be made within the range without departing from the technical concept and the scope of the present disclosure that an ordinary person skilled in the technical field to which the present disclosure belongs can understand. In addition, it should be understood that such substitutions, modifications, and changes belong to the appended claims.

The invention claimed is:

1. A card socket for mounting a SIM card or an SD card for a mobile communication terminal, the card socket comprising:
a housing having a terminal portion and a switch portion, the terminal portion having a contact terminal disposed therein, the switch portion being formed inside the terminal portion in a longitudinal direction of the housing; and
a shell having an upper wall, a sidewall, a sensing portion and a coupling portion, the sidewall extended downward from the upper wall in a height direction, the sidewall configured to be coupled to the housing, the sensing portion extended from the upper wall to sense insertion of a card tray into the card socket, the coupling portion extended downward from the upper wall in the height direction and configured to be inserted into the switch portion.

2. The card socket of claim 1, wherein the switch portion comprises a stopper which is configured to come into contact with an upper surface of the sensing portion and to prevent the sensing portion from being lifted up in the height direction.

3. The card socket of claim 1, wherein the sensing portion has a shape extended downward from the upper wall in the height direction and then extended toward the other side in a width direction.

4. The card socket of claim 1, wherein the terminal portion comprises a first terminal portion which is formed on one side in a width direction and has a first terminal disposed therein, and a second terminal portion which is formed on the other side in the width direction of the housing and has a second terminal and a third terminal disposed therein.

5. The card socket of claim 1, wherein the switch portion comprises a switch extended upward in the height direction of the housing, and wherein the sensing portion is configured to move down in the height direction and to come into contact with the switch when the card tray comes into contact with the sensing portion.

6. The card socket of claim 1, wherein the coupling portion has a recess formed therein to have a part of the switch portion inserted thereinto.

7. The card socket of claim 1, wherein the coupling portion comprises a wedge portion having an inclined shape to come into contact with the switch portion.

8. The card socket of claim 1, wherein the sensing portion comprises an inclined portion which is extended outward in the longitudinal direction and is inclined toward the switch portion.

9. The card socket of claim 4, wherein the second terminal portion comprises a second-a terminal portion in which the second terminal is formed, and a second-b terminal portion in which the third terminal is formed, and wherein the second-b terminal portion is disposed more inwards in the longitudinal direction than the second-a terminal portion.

10. The card socket of claim 9, wherein an inward leading end of the first terminal portion is formed more inwards in the longitudinal direction than an inward leading end of the second-a terminal portion.

11. The card socket of claim 4, further comprising a hinge installed inwards in the longitudinal direction of the switch portion, and an eject bar installed on a position of one side of the first terminal portion in the width direction to be slidable in the housing along the longitudinal direction.

12. The card socket of claim 4, wherein the second terminal comprises a plurality of contact terminals, and wherein a contact terminal from among the plurality of contact terminals that is adjacent to the first terminal portion and is positioned outward in the longitudinal direction comprises a main contact terminal and sub contact terminals formed on both sides of the main contact terminal to have a maximum height lower than the main contact terminal.

13. A card connector for mounting a SIM card or an SD card for a mobile communication terminal, the card connector comprising:
a card tray; and
a card socket having a housing and a shell, the housing having a terminal portion and a switch portion, the terminal portion configured to be coupled to a contact terminal, the switch portion formed more inwards in a longitudinal direction than the terminal portion, the shell being coupled to the housing to form a receiving space, the shell having a sensing portion and a coupling portion, the sensing portion extended from the shell, the coupling portion extended downward from the shell in a height direction, the coupling portion configured to be inserted into the switch portion,
wherein the card tray is configured to be inserted into the receiving space, the sensing portion configured to sense insertion of the card tray into the receiving space of the card socket.

14. The card connector of claim 13, wherein the sensing portion has a shape extended downward from the shell in the height direction and then extended upward in the height direction, wherein the switch portion comprises a stopper which is configured to come into contact with an upper surface of the sensing portion and to prevent the sensing portion from being lifted up in the height direction, and wherein the terminal portion comprises a first terminal portion which is formed on one side in a width direction and has a first terminal disposed therein, and a second terminal portion which is formed on the other side of the housing in the width direction and has a second terminal and a third terminal disposed therein.

15. The card connector of claim 13, wherein the card tray comprises a first frame portion which is formed on one side in the width direction, and is configured to come into contact with the sensing portion when being inserted into the receiving space, and a second frame portion which is formed on the other side in the width direction.

16. The card connector of claim 15, wherein the first frame portion is configured to have a shorter length than the second frame portion in the longitudinal direction of the card tray, and wherein an inward leading end of the second frame portion is formed more inwards than an inward leading end of the first frame portion.

17. The card connector of claim 15, wherein a card of a first type is received in the first frame portion, and one or more cards of a second type which are smaller than the card of the first type are received in the second frame portion.

18. The card connector of claim 15, wherein the second frame portion comprises a second-a frame portion and a second-b frame portion which are arranged in parallel with each other in the longitudinal direction of the card tray.

19. The card connector of claim 13, wherein the card socket further comprises a hinge installed inwards in the longitudinal direction of the switch portion, and an eject bar installed to be slidable in the housing along the longitudinal direction and configured to dismount the card tray from the card socket when coming into contact with the hinge.

* * * * *